United States Patent [19]

Inoue et al.

[11] Patent Number: 5,119,371
[45] Date of Patent: Jun. 2, 1992

[54] AUTOMOTIVE MULTIPATH TRANSMISSION SYSTEM WITH POWER ALWAYS SUPPLIED TO AT LEAST TWO TRANSMISSION UNIT

[75] Inventors: Kiyoshi Inoue; Atsuhiko Suzuki, both of Hiratsuka; Yukio Nanpo, Fujisawa; Yusaku Himono, Tokyo; Osamu Michihira; Yuichi Ito, both of Hiroshima, all of Japan

[73] Assignees: The Furukawa Electric Co., Ltd., Tokyo; Mazda Motor Corp., Hiroshima, both of Japan

[21] Appl. No.: 423,988

[22] Filed: Oct. 18, 1989

[30] Foreign Application Priority Data

Oct. 21, 1988 [JP] Japan .............. 63-264040

[51] Int. Cl.$^5$ .................................. H04J 3/02
[52] U.S. Cl. ......................... 370/85.1; 370/85.2; 370/85.3; 370/67; 370/94.1
[58] Field of Search ............... 370/85.1, 85.2, 85.3, 370/94.1, 51, 52, 67; 340/825.16

[56] References Cited

U.S. PATENT DOCUMENTS

| 4,429,384 | 1/1984 | Kaplinsky | 370/85 |
| 4,656,471 | 4/1987 | Hanss et al. | 340/825.16 |
| 4,860,006 | 8/1989 | Barall | 370/85.3 |
| 4,939,725 | 7/1990 | Matsuda et al. | 370/85.3 |

FOREIGN PATENT DOCUMENTS 63-264040  10/1989  Japan .

OTHER PUBLICATIONS

"Multiplex Technology"; Feb. 29–Mar. 4, 1988 Issue; Society of Automotive Engineers, Inc., Warendale, Pa.; Article entitled Chrysler Collision Detection (C$^2$D TM) Bus Interface, Integrated Circuit User Manual; R. E. Fassnacht and W. H. Madden; pp. 1–18 (particularly p. 2).

Primary Examiner—Douglas W. Olms
Assistant Examiner—S. Hom
Attorney, Agent, or Firm—Frishauf, Holtz, Goodman & Woodward

[57] ABSTRACT

A multipath transmission system for an automobile according to the present invention comprises a plurality of multiplex transmission units connected in parallel with each other to one common bus. Each transmission unit is assigned to one of groups in which various devices attached to the automobile are classified. The transmission unit includes a sending circuit for transmitting the multiple signals from the devices in the group concerned to the other units through the bus. The system further comprises a power source for always applying electric power to the sending circuit of at least one of the multiplex transmission units. Only that multiplex transmission unit to which the electric power is always applied is provided with a bias circuit which sets the potential of the multiple signals on the bus when the multiple signals are supplied from the sending circuits of any multiplex transmission unit to the bus.

6 Claims, 4 Drawing Sheets

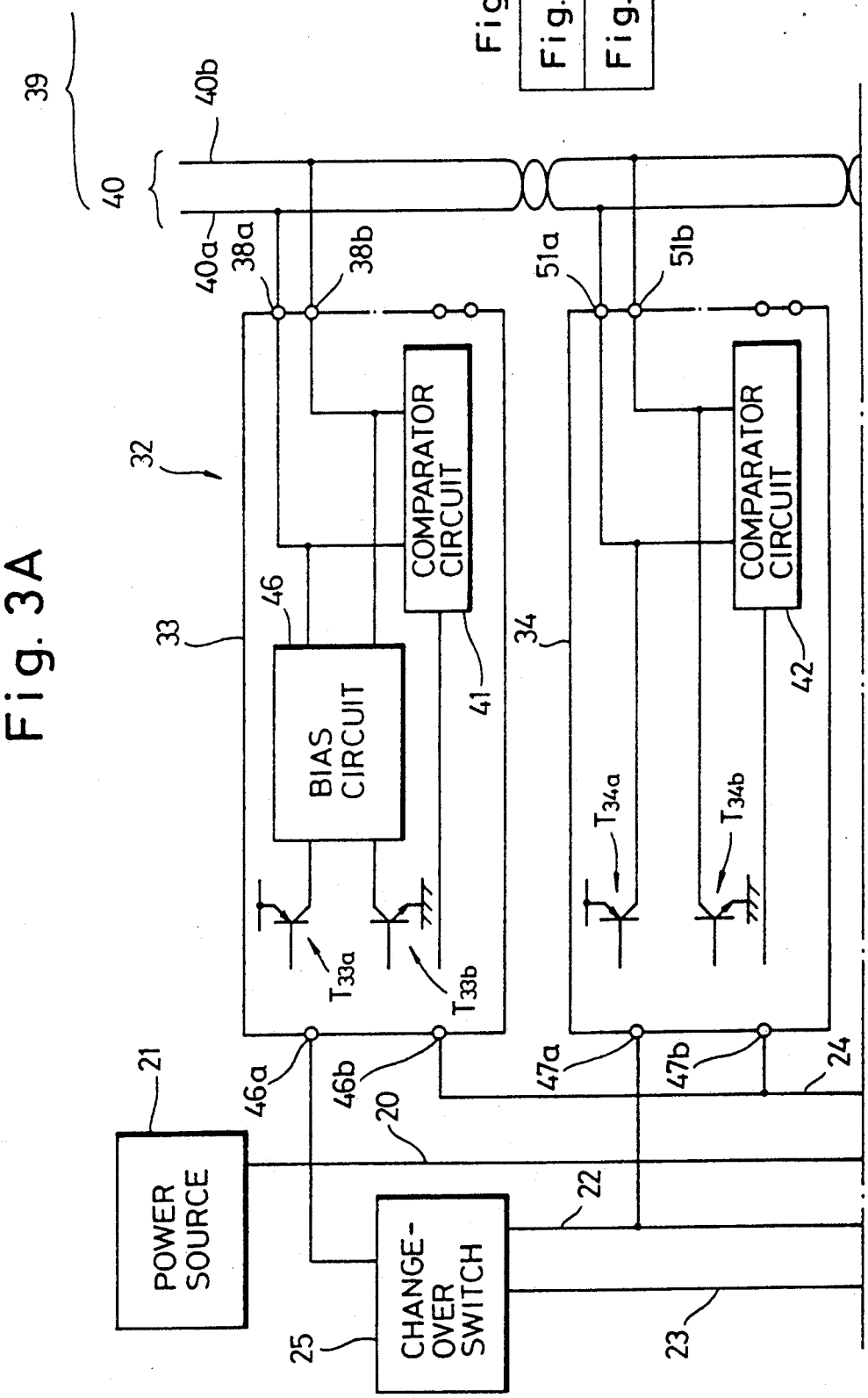
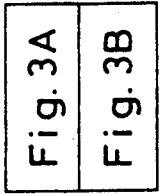

AUTOMOTIVE MULTIPATH TRANSMISSION SYSTEM WITH POWER ALWAYS SUPPLIED TO AT LEAST TWO TRANSMISSION UNIT

BACKGROUND OF THE INVENTION

The present invention relates to multipath transmission systems used for sending and receiving multiple signals between units which have a multiplex transmission function and are arranged in automobiles.

One such multipath transmission system comprises a plurality of multiplex transmission units having a multipath transmission function. Each of the multiplex transmission units is located at a predetermined position within automobiles. The multiplex transmission units serve to collectively control device groups. For example, one device group includes windshield wipers, power windows, door lock, etc., and another device group includes various meters, warning lamp, indicators. etc. The individual units are connected to a common multiplex transmission path or so-called bus. Therefore, the transmission of multiple signals between the multiplex transmission units is performed through the bus to control the device groups.

To this end, the aforementioned multiplex transmission units each include a sending/receiving device for sending and receiving the multiple signals toward or from the bus. The sending circuit of the sending/receiving device, as is disclosed in U.S. Pat. No. 4,429,384, for example, is a switching circuit having an npn transistor, a pnp transistor, and a bias resistor. This switching circuit is connected to a corresponding line of the bus, and serves to adjust the potential on the line to one of two predetermined values, for example, 0 or 5 V, when the transistor is turned on or off.

In a multiplex transmission unit which is not serving the multiple signal transmission, the transistor of the sending circuit thereof is turned off. Thus, the multiple signals delivered from any other multiplex transmission units onto the bus cannot be destroyed.

It is to be first noted, with respect to the multipath transmission system described above, that if the number of multiplex transmission units connected to the bus increases, then the number of bias resistors connected in parallel with each other to one line of the bus also increases, so that the current of the transistor in the sending circuit of one transmission unit varies, depending on the number of units connected to the bus, when the multiple signals are transmitted from the sending circuit of one transmission unit to the bus line. Secondly, the increase of the bias resistors in number results in too small a resistance value for the whole circuit associated with the bus line. Accordingly, the current of the transistors in the sending circuits may possibly exceed its maximum permissible level, thereby damaging the transistors.

The multipath transmission system may be provided additionally with a limiter circuit for limiting the current of the transistors. In this case, however, the signal levels produced on the bus becomes too small to transmit the multiple signals.

In incorporating the multipath transmission system in an automobile, therefore, the aforementioned circumstances should be taken into consideration. More specifically, automobiles of the same model may be furnished with different meters or devices, that is, they may be different in grade. As regards the multiplex transmission unit, the difference in grade may possibly result in variation of the number of multiplex transmission units connected to the bus. If the number of transmission units varies, then the current of the transistors in the sending circuits changes considerably during the multiple signal transmission, as mentioned before. Such a change of the current constitutes a hindrance to secure multiple signal transmission. In actually incorporating the multipath transmission system in the automobile, therefore, it is necessary to change the circuit configuration of the multipath transmission system in accordance with the variation of the number of multiplex transmission units attributable to the difference in grade.

In order to minimize power consumption in the automobile, moreover, a system is employed in which power circuits for the individual devices are opened or closed in accordance with the key position of an ignition switch. Also in the multipath transmission system, therefore, it is advisable to use a system in which power circuits for the multiplex transmission units are opened or closed in accordance with the key position. In the multipath transmission system described above, however, even though there are multiplex transmission units whose power circuits are opened for non-operating, the bias resistors of the sending circuits of these units are left connected to the bus lines. Thus, the current flowing through the transistors of the sending circuits may vary, depending on the number of multiplex transmission units whose power circuits are closed. This may possibly lead to a change of voltage on the bus, so that the signals cannot be accurately transmitted through the bus.

OBJECT AND SUMMARY OF THE INVENTION

The present invention has been contrived in consideration of these circumstances, and its object is to provide a multipath transmission system adapted for use in automobiles, in which multiple signals can be securely transmitted without any adverse effects attributable to a change of the number of multiplex transmission units connected to a multiplex transmission path.

The above object is achieved by a multipath transmission system according to the present invention, which comprises:

a common multiplex transmission path;

a plurality of multiplex transmission units connected in parallel with each other to the multiplex transmission path, each of the multiplex transmission units including a sending circuit for sending multiple signals from one of several groups in which various devices attached to an automobile are classified, to the multiplex transmission path;

power supply means capable of applying electric power to the sending circuits of the individual multiplex transmission units, and adapted to always apply electric power to the sending circuit of at least two of the multiplex transmission units; and a bias circuit provided only in the multiplex transmission unit to which the electric power is always applied by the power supply means, and adapted to set the potential of the multiple signals on the multiplex transmission path when the multiple signals are supplied from the sending circuit of any multipath transmission unit to the multiplex transmission path.

According to the multipath transmission system described above, the bias circuit for setting the voltage level of the multiple signals supplied to the multiplex transmission path is incorporated only in the multiplex transmission unit to be always supplied with the electric power. Therefore, even if a multiplex transmission unit including no bias circuit is additionally connected to the multiplex transmission path, or if any connected unit without the bias circuit is removed from the transmission path, the voltage level of the multiple signals supplied from the individual transimssion units to the transmission path cannot be changed. In consequence, the multiplex transmission units can equally transmit the multiple signals, thus ensuring higher reliability of signal transmission.

Preferably, in the multipath transmission system of the present invention, the multiplex transmission unit with the bias circuit therein should be one associated with the group of devices which are regularly attached to automobiles, and the units with the bias circuit should be at least two in number.

If the multiplex transmission units including the bias circuit correspond to the groups of devices regularly attached to the automobiles, they can be reduced in number with respect to the whole multipath transmission system. Moreover, the signal transmission cannot be adversely affected by a change, if any, of the number of multiplex transmission units connected to the multiplex transmission path, which are attributable to the variation of the grade of the automobiles.

If the multiplex transmission units with the bias circuit are at least two in number, furthermore, the whole multipath transmission system cannot immediately suffer malfunction even when one of these units is in trouble. Thus, the reliability and safety of the signal transmission can be improved.

The above and other objects, features, and advantages of the invention will be more apparent from the ensuing detailed description taken in connection with the accompanying drawings.

BRIEF DESCRIPTION OF THE DRAWINGS

FIG. 3, FIG. 3A and FIG. 3B are block diagrams of the multipath transmission system of FIG. 1, showing a second embodiment of the present invention.

DETAILED DESCRIPTION

Figure 1:
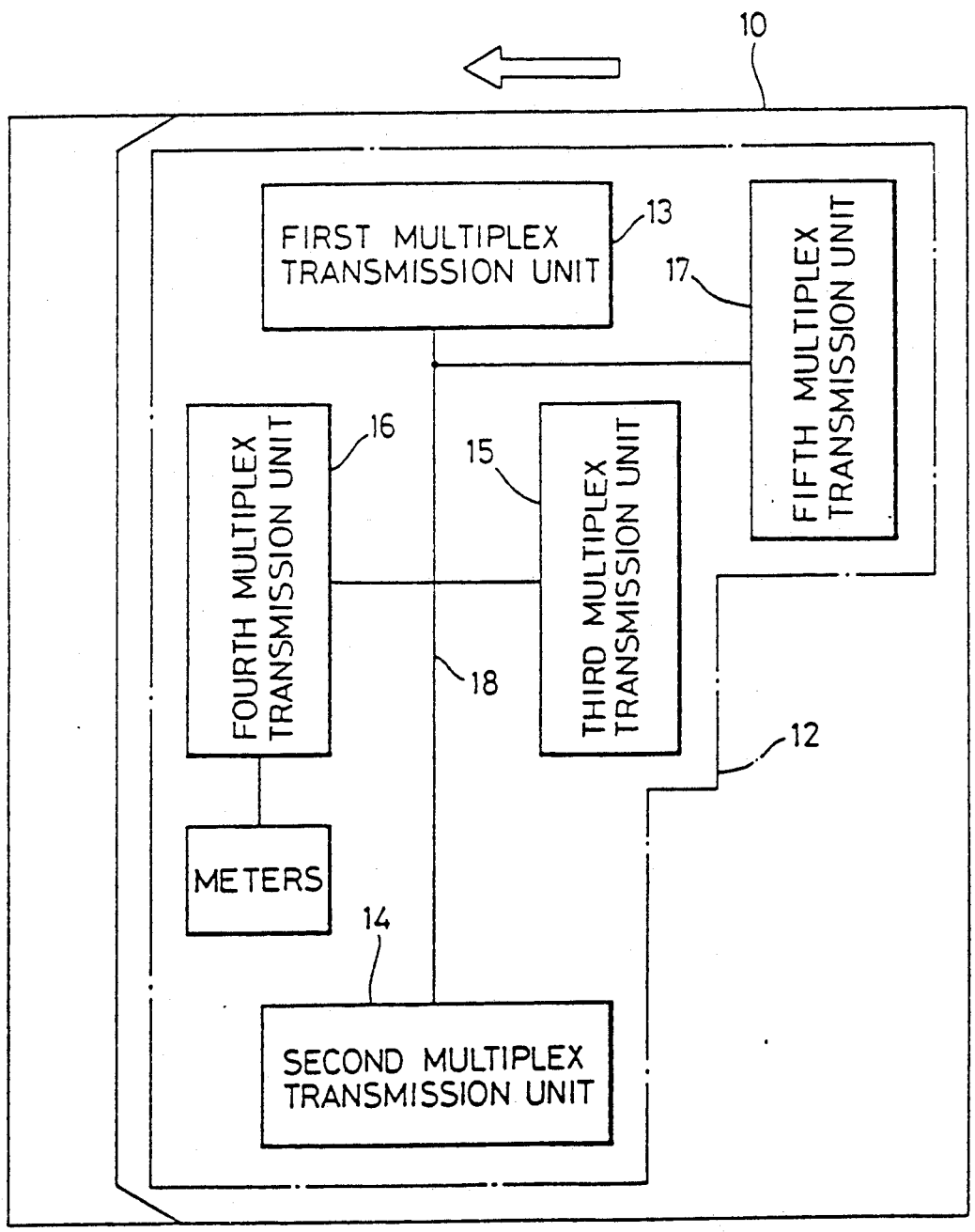
FIG. 1 shows a layout of a multipath transmission system incorporated in an automobile.

Referring now to FIG. 1, there is shown a multipath transmission system 12 incorporated in an automobile 10 which is shown only schematically. The multipath transmission system 12 comprises a plurality of multiplex transmission units, e.g., first to fifth multiplex transmission units 13 to 17 (hereinafter referred to simply as first to fifth units). The first and fourth units 13 and 16, among these first to fifth units 13 to 17, are associated individually with groups of various fundamental meters and devices regularly attached to the automobile. More specifically, first unit 13 serves to collectively control one of groups of those devices which can be operated with relatively low power, such as windshield wipers, power windows, door locks, etc. The fourth unit 16 serves to send data signals as multiple signals from another group of the various meters, indicators and caution-advisory lamps.

Further, the second and third units 14 and 15 are associated with groups of those devices which can operate in response to the key position of an ignition switch (not shown) of the automobile. The fifth unit 17 is associated with a group of optional parts or devices that are optionally attached to the automobile according to users' preference. Therefore, the automobile is not always furnished with the fifth unit 17 and the device group associated therewith.

The first to fifth units 13 to 17 are connected to a common multiplex transmission path, i.e., a so-called bus 18.

Among the devices associated with the units 13 to 17, only the aforesaid meters associated with the fourth unit 16 are shown as a block in FIG. 1. The arrow of FIG. 1 indicates the advancing direction of the automobile.

Figure 2:
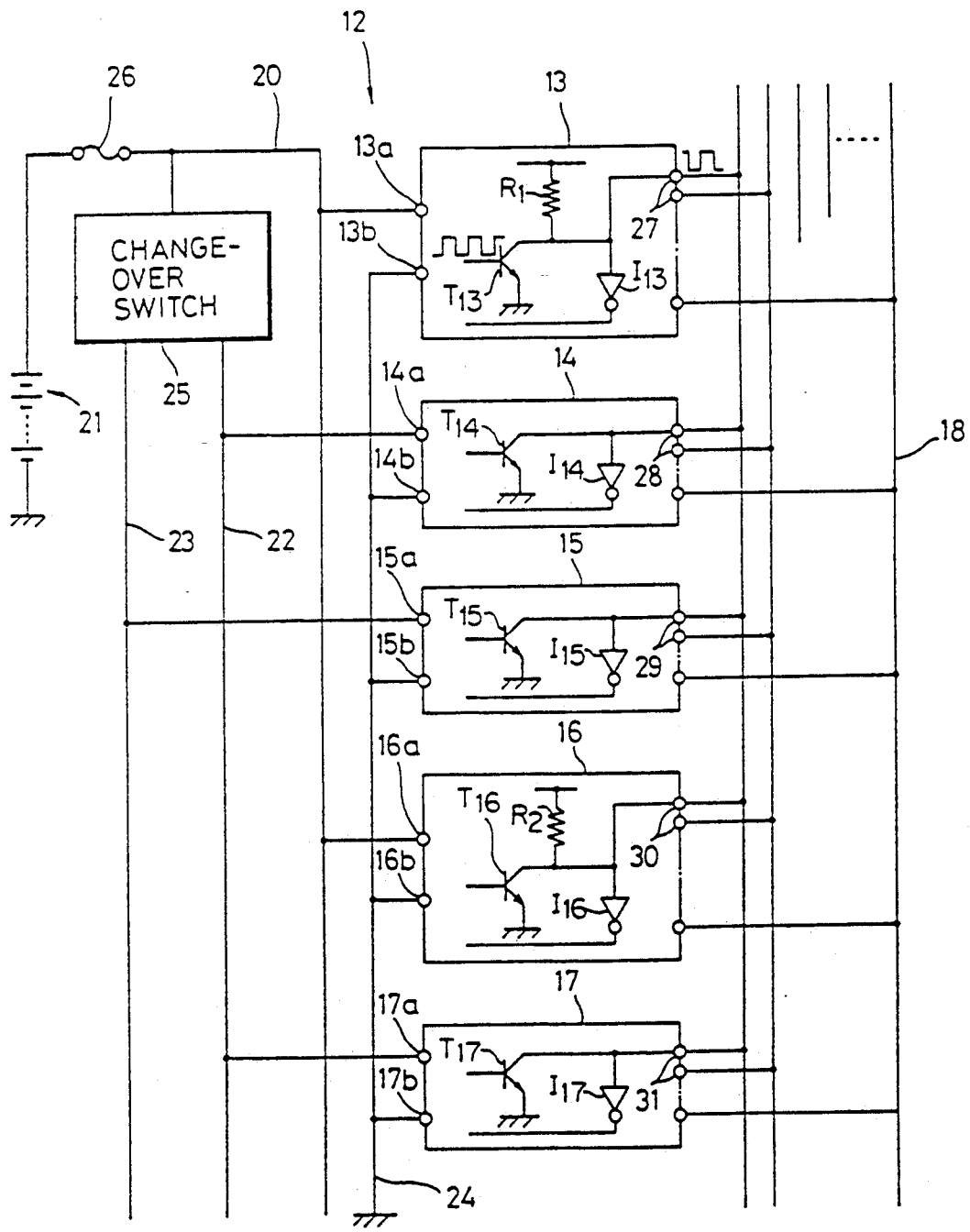
FIG. 2 is a block diagram of the multipath transmission system of FIG. 1, showing a first embodiment of the present invention.

Referring now to FIG. 2, there is shown a specific configuration of the multipath transmission system of FIG. 1. Power supply terminals 13a and 16a of the first and fourth units 13 and 16 are connected to a feed line 20, which is connected directly to a power source 21. Power supply terminals 14a and 17a of the second and seventh units 14 and 17 are connected to a feed line 22, and power supply terminals 15a of the third unit 15 are connected to a feed line 23. Earth terminals 13b, 14b, 15b, 16b and 17b of the units 13 to 17 are grounded by means of an earth line 24.

The feed lines 22 and 23 are connected to the feed line 20 through a changeover switch 25. The switch 25 is shifted in accordance with the key position of the ignition switch, thereby connecting or disconnecting the feed lines 22 and 23 to or from the power source 21. The feed line 20 is provided with a fuse 26 on the power-source side.

The first to fifth units 13 to 17 each include sending circuits and receiving circuits for sending or receiving multiple signals to or from the corresponding groups of devices through the bus 18. These sending and receiving circuits are shown only schematically. In the first unit 13, by way of example, each sending circuit is formed of a switching circuit including npn transistors. In FIG. 2, only one npn transistor T13 is shown as being included in the switching circuit of the first unit 13, for simplicity of illustration. This transistor T13 cooperates with one of the devices in the device group associated with the first unit 13, so that the transistor T13 can be turned on or off in accordance with an input signal from the device concerned. The emitter of the transistor T13 is grounded, while its collector is connected to one of several input/output terminals 27 of the first unit 13. This input/output terminal 27 is connected to one line of the bus 18.

The receiving circuit paired with the sending circuit or the transistor T13 includes an inverter I13 which is connected in parallel with the transistor T13. The input terminal of the inverter I13 is connected to a node between the transistor T13 and the input/output terminal 27. This receiving circuit cooperates with the corresponding device.

In the first unit 13, the other devices associated therewith are also connected to their corresponding input/output terminals 27 through sending and receiving circuits similar to the aforementioned ones. The terminals 27 are connected to their corresponding lines of the bus 18.

The sending circuits and the receiving circuits of the second to fifth units 14 to 17 have the same circuit configuration as those of the first unit 14. Therefore, the transistors and inverters of the second to fifth units 14 to 17, which correspond to those of the first unit 13, are designated by the same symbols for their counterparts of the first unit 13 except for postfixed numerals that are identical with the reference numerals for their corresponding units, and a description of those similar parts is omitted herein. Numerals 28, 29, 30 and 31 denote input/output terminals of the second, third, fourth, and fifth units 14, 15, 16 and 17, respectively.

In the multipath transmission system described above, a bias circuit is further provided with each of those units which are continually connected to the power source 21 without regard to the shift position of the changeover switch 25, that is, the first and fourth units 13 and 16 that are associated with the groups of those devices which are regularly attached to the automobile, irrespective of the grade thereof. In the first unit 13, by way of example, the bias circuit is represented by a load resistor R1, which is connected at one end to the collector of the transistor T13 as shown in FIG. 2, and is continually connected at the other end to the power source 21. Also, the bias circuit of the fourth unit 16 is represented by a load resistor R2 which is similar to the resistor R1 of the first unit 13.

The respective resistance values of the load resistors R1 and R2 are set so that current flowing through the collector of the transistor T of each sending circuit, i.e., collector current, has a proper value when the multiple signals are transmitted between the units through the bus 18.

In the embodiment described above, the multipath transmission system 12 comprises the five units. When connecting additional multiplex transmission units to the bus 18, these new units should be ones which include no bias circuit, that is, units having the same circuit configuration as the units 14, 15 and 17. In general, automobiles of the same model may be furnished with different devices, depending on their grades or users' option. Therefore, those multiplex transmission units which are associated with some device groups may or may not be added to the system 12, depending on whether the automobile is furnished with those optional devices. If the automobile is furnished with any other device groups than regular device groups, the transmission units for these optional device groups should be ones similar to the units 14, 15 and 17, as mentioned before.

In the multipath transmission system 12 described above, the bias circuits are included in the two units, i.e., the first and fourth units 13 and 16, so that the whole transmission system 12 cannot immediately suffer malfunction even if the bias circuit of one unit is in trouble.

The following is a description of the operation of the multipath transmission system 12.

First, when the first unit 13 which includes the bias circuit, among the first to fifth units 13 to 17, gets ready to be used for the transmission of multiple signals, that is, when the transistor T13 of the first unit 13 is turned on, a predetermined collector current flows into the collector of the transistor T13 through a power circuit defined by the power source 21, the load resistors R1 and R2 in the first and fourth units 13 and 16, respectively, and the corresponding lines of the bus 18. In this case, the voltage produced by the collector current flow through the load resistor R1, to be supplied from the input/output terminal 27 of the first unit 13 to the corresponding line of the bus 18, is about 0 V. When the transmission of the multiple signals from the first unit 13 is performed, the transistor T13 is turned off. Thereupon, no current flows through the load resistor R1, so that the voltage supplied from the input/output terminal 27 of the first unit 13 to the corresponding line of the bus 18 is about 5 V.

As the transistor T13 is turned on or off in this manner, the potential on the line of the bus 18 associated with the transistor T13 is shifted to about 0 or 5 V, and the resulting voltage signal or the multiple signals are transmitted toward the other units through the bus 18.

In the arrangement described above, multiple signals are transmitted from the first unit 13 to the other units. However, in transmitting multiple signals from any one of the other units to the first unit 13 through the bus 18, in contrast with this, the first unit 13 is switched from a signal sending state to a signal receiving state.

If the fourth unit 16 gets ready to transmit the multiple signals, on the other hand, a transistor T16 is turned on or off, by cooperating with the power circuit defined by the power source 21, the load resistors R1 and R2 in the first and fourth units 13 and 16, respectively, and the corresponding lines of the bus 18, just as in the aforementioned case. Thereupon, the voltages of the bus lines corresponding to the input/output terminals 30 are changed, and the resulting voltage signals or the multiple signals are transmitted to the other units through the bus 18. Also in the case of the fourth unit 16, moreover, the fourth unit can receive the multiple signals from the other units through the receiving circuits thereof.

By shifting the changeover switch 25, furthermore, those other units than the first and fourth units 13 and 16, e.g., the second and fifth units 14 and 17, which include no bias circuit, may be also connected to the power source 21. When the second unit 14 is enabled to transmit the multiple signals, for example, the transistor T14 is turned on or off by cooperating with the aforesaid power circuit, and the multiple signals can be transmitted from the second unit 14 to the other units through the bus 18.

As is evident from the above description, the other units, i.e., the third and fifth units 15 and 17, can be used to transmit the multiple signals in the same manner as aforesaid.

According to the multipath transmission system 12 of the present invention, as described above, when the individual units are enabled to transmit the multiple signals, their sending circuits are connected to the same power circuit, without regard to the shift position of the changeover switch 25 or the change of the number of units connected to the bus 18. Thus, the individual units equally serve to transmit the multiple signals.

Figure 3B:
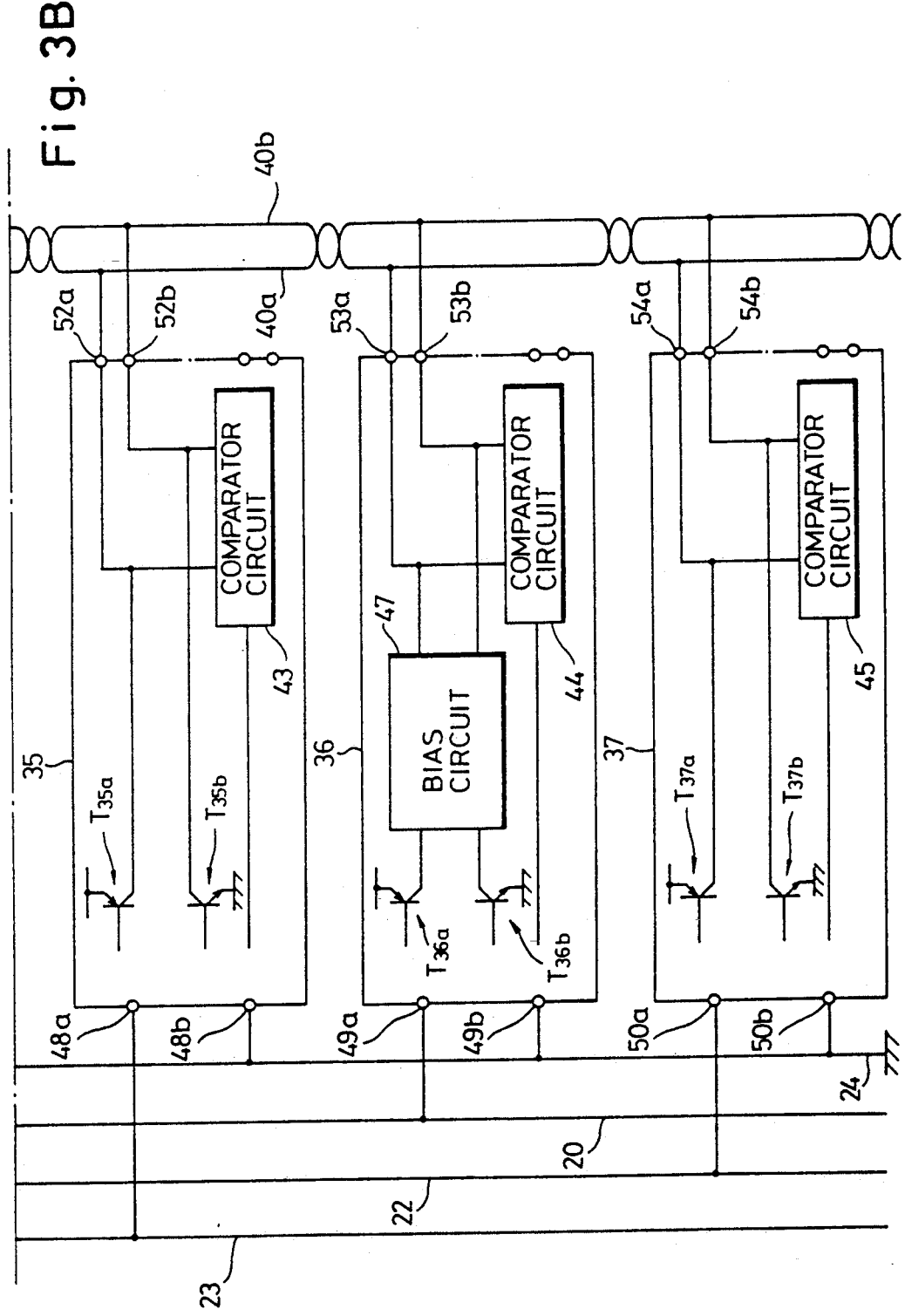

The present invention is not limited to the multipath transmission system 12 according to the first embodiment described above. Referring now to FIG. 3, there is shown a multipath transmission system 32 according to a second embodiment. Also in this second embodiment, the multipath transmission system 32 comprises five units 33, 34, 35, 36 and 37, which correspond to the first to fifth units 13, 14, 15, 16 and 17, respectively.

The sending circuit of the unit 33 is formed of a combination of a switching circuit including a pnp transistor 33a and a switching circuit including an npn transistor T33b. Thus, two input/output terminals 38a and 38b are assigned to the one sending circuit. These input/output terminals 38a and 38b are connected individually to specific lines of a bus 39. In this embodiment, the bus lines corresponding to the one sending circuit are formed of a twisted pair wire. Only one twisted pair wire is shown in FIG. 3.

In the unit 33, a receiving circuit associated with the one sending circuit includes a comparator circuit 41 which is used to compare the voltages of two transmission lines 40a and 40b of its corresponding twisted pair wire 40.

The other units 34 to 37 also each comprise sending and receiving circuits similar to those of the unit 33. In the unit 34, 35, 36 or 37, as seen from FIG. 3, sending circuits include a pair of transistors T34a and T34b; T35a and T35b; T36a and T36b; or T37a and T37b, respectively, and receiving circuits associated with the sending circuits include a comparator circuit 42, 43, 44 or 45, respectively.

The units 33 and 36 of the second embodiment, which correspond to the first and fourth units 13 and 16 of the first embodiment, respectively, incorporate bias circuits 46 and 47, respectively. These bias circuits 46 and 47, like the ones according to the first embodiment, serve not only to supply a specific voltage signal to both transmission lines of each corresponding twisted pair wire, in response to the on-off operations of their corresponding pairs of transistors, when one of the units is ready to transmit the multiple signals, but also to protect the sending and receiving circuits of the units in case of any trouble in the feed lines or transmission lines.

In FIG. 3, numerals 46a and 46b; 47a and 47b; 48a and 48b; 49a and 49b; and 50a and 50b denote power supply terminals and earth terminals of the units 33, 34, 35, 36 and 37, respectively, while numerals 51a and 51b; 52a and 52b; 53a and 53b; and 54a and 54b denote input/output terminals of the units 34 to 37, respectively, which are similar to the input/output terminals 38a and 38b of the unit 33.

It is to be understood that the multipath transmission system 32 of the second embodiment described above has the same function as the system 12 of the first embodiment. Unlike the first embodiment, however, the second embodiment uses the twisted pair wires for the signal transmission. With the arrangement of the second embodiment, therefore, the redundancy of the signal transmission can be improved to ensure satisfactory reliability in the signal transmission.

What is claimed is:

1. A multipath transmission system for effecting multiplex transmission of multiple signals from or to various devices attached to an automobile, comprising:
   a common multiplex transmission path;
   a plurality of individual multiplex transmission units connected in parallel with each other to the common multiplex transmission path, each of said multiplex transmission units including a sending circuit for sending the multiple signals from one of several groups in which the various devices are classified;
   power supply means for applying electric power to the sending circuits of the individual multiplex transmission units, and adapted to always apply electric power to the sending circuits of at least two of the multiplex transmission units; and
   bias circuits provided only in the multiplex transmission units to which the electric power is always applied by the power supply means, and adapted to set the potential of the multiple signals on the common multiplex transmission path when the multiple signals are supplied from the sending circuit of any multiplex transmission unit to the common multiplex transmission path.

2. The multipath transmission system according to claim 1, wherein said multiplex transmission units provided with the bias circuits are assigned to those groups of devices which are regularly attached to automobiles of any grades of one and the same model.

3. The multipath transmission system according to claim 1, wherein the sending circuit of each said multiplex transmission unit includes a switching circuit having a transistor.

4. The multipath transmission system according to claim 3, wherein said bias circuit includes a bias resistor connected to the transistor.

5. The multipath transmission system according to claim 1, wherein the sending circuit of each said multiplex transmission unit includes a switching circuit having a pair of transistors, and two lines of said multiplex transmission path connected individually to the sending circuits are formed of a twisted pair wire, the respective paired transistors being connected individually to the twisted pair wire, respectively.

6. The multipath transmission system according to claim 5, wherein said pair of transistors include an npn transistor and a pnp transistor.

* * * * *